US009626337B2

(12) United States Patent
Kaasila et al.

(10) Patent No.: US 9,626,337 B2
(45) Date of Patent: Apr. 18, 2017

(54) ADVANCED TEXT EDITOR

(71) Applicant: Monotype Imaging Inc., Woburn, MA (US)

(72) Inventors: Sampo Juhani Kaasila, Plaistow, NH (US); Vladimir Levantovsky, North Andover, MA (US); Anand Vijay, Madhya Pradesh (IN); Jitendra Kumar Bansal, Rajasthan (IN)

(73) Assignee: Monotype Imaging Inc., Woburn, MA (US)

( * ) Notice: Subject to any disclaimer, the term of this patent is extended or adjusted under 35 U.S.C. 154(b) by 171 days.

(21) Appl. No.: 14/151,062

(22) Filed: Jan. 9, 2014

(65) Prior Publication Data
US 2014/0195903 A1    Jul. 10, 2014

Related U.S. Application Data

(60) Provisional application No. 61/750,616, filed on Jan. 9, 2013.

(51) Int. Cl.
*G06F 17/00* (2006.01)
*G06F 17/21* (2006.01)
(52) U.S. Cl.
CPC ................... *G06F 17/214* (2013.01)
(58) Field of Classification Search
CPC .................................................... G06F 17/214
See application file for complete search history.

(56) References Cited

U.S. PATENT DOCUMENTS

| 4,244,657 A | 1/1981 | Wasylyk |
| 4,998,210 A | 3/1991 | Kadono |

(Continued)

FOREIGN PATENT DOCUMENTS

| EP | 2166488 A2 | 3/2010 |
| EP | 2857983 | 4/2015 |

(Continued)

OTHER PUBLICATIONS

Adobe Systems Incorporated, "The Type 42 Font Format Specification," Technical Note #5012, Jul. 31, 1998, pp. 1-24.

(Continued)

*Primary Examiner* — Lauries Ries
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving information that represents a font and a portion of textual content of an asset. Operations also include identifying one or more typographical features supported by a scalable font format that are capable of being applied to the portion of the textual content based upon the received information representing the font and the portion of textual content of the asset. Operations also include presenting, by the computing device, an exclusive set of selectable representations. Each of the selectable representations represents one of the one or more identified typographical features supported by the scalable font format for initiating application of the corresponding typographical feature to the textual content of the asset.

30 Claims, 8 Drawing Sheets

(56) References Cited

U.S. PATENT DOCUMENTS

| | | | |
|---|---|---|---|
| 5,347,266 A | 9/1994 | Bauman et al. | |
| 5,412,771 A | 5/1995 | Fenwick | |
| 5,416,898 A | 5/1995 | Opstad et al. | |
| 5,444,829 A | 8/1995 | Kawabata et al. | |
| 5,453,938 A | 9/1995 | Gohara et al. | |
| 5,526,477 A | 6/1996 | McConnell et al. | |
| 5,528,742 A | 6/1996 | Moore et al. | |
| 5,533,174 A | 7/1996 | Flowers et al. | |
| 5,586,242 A | 12/1996 | McQueen et al. | |
| 5,606,649 A | 2/1997 | Tai | |
| 5,619,721 A | 4/1997 | Maruko | |
| 5,630,028 A * | 5/1997 | DeMeo | G06K 15/02 358/1.11 |
| 5,737,599 A | 4/1998 | Rowe et al. | |
| 5,748,975 A * | 5/1998 | Van De Vanter | G06F 8/33 715/236 |
| 5,757,384 A | 5/1998 | Ikeda | |
| 5,781,714 A | 7/1998 | Collins et al. | |
| 5,877,776 A | 3/1999 | Beaman et al. | |
| 5,940,581 A | 8/1999 | Lipton | |
| 5,995,718 A | 11/1999 | Hiraike | |
| 6,012,071 A | 1/2000 | Krishna et al. | |
| 6,016,142 A * | 1/2000 | Chang | G06F 3/0236 345/168 |
| 6,031,549 A | 2/2000 | Hayes-Roth | |
| 6,044,205 A | 3/2000 | Reed et al. | |
| 6,065,008 A | 5/2000 | Simon et al. | |
| 6,073,147 A | 6/2000 | Chan et al. | |
| 6,111,654 A | 8/2000 | Cartier | |
| 6,141,002 A | 10/2000 | Kanungo et al. | |
| 6,249,908 B1 | 6/2001 | Stamm | |
| 6,252,671 B1 | 6/2001 | Peng et al. | |
| 6,282,327 B1 * | 8/2001 | Betrisey | G06F 17/214 345/469 |
| 6,313,920 B1 | 11/2001 | Dresevic et al. | |
| 6,320,587 B1 | 11/2001 | Funyu | |
| 6,330,577 B1 | 12/2001 | Kim | |
| 6,343,301 B1 | 1/2002 | Halt et al. | |
| 6,426,751 B1 * | 7/2002 | Patel | G06F 17/214 345/468 |
| 6,490,051 B1 | 12/2002 | Nguyen et al. | |
| 6,512,531 B1 | 1/2003 | Gartland | |
| 6,522,330 B2 | 2/2003 | Kobayashi | |
| 6,522,347 B1 | 2/2003 | Tsuji | |
| 6,583,789 B1 | 6/2003 | Carlson et al. | |
| 6,657,625 B1 | 12/2003 | Chik et al. | |
| 6,675,358 B1 | 1/2004 | Kido | |
| 6,678,688 B1 | 1/2004 | Unruh | |
| 6,687,879 B1 | 2/2004 | Teshima | |
| 6,704,116 B1 | 3/2004 | Abulhab | |
| 6,704,648 B1 | 3/2004 | Naik et al. | |
| 6,718,519 B1 | 4/2004 | Taieb | |
| 6,738,526 B1 | 5/2004 | Betrisey | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,853,980 B1 | 2/2005 | Ying et al. | |
| 6,856,317 B2 | 2/2005 | Konsella et al. | |
| 6,882,344 B1 | 4/2005 | Hayes et al. | |
| 6,901,427 B2 | 5/2005 | Teshima | |
| 6,907,444 B2 | 6/2005 | Narasimhan et al. | |
| 6,952,210 B1 | 10/2005 | Renner et al. | |
| 6,993,538 B2 | 1/2006 | Gray | |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 | 12/2006 | Adler et al. | |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,346,845 B2 | 3/2008 | Teshima et al. | |
| 7,477,988 B2 | 1/2009 | Dorum | |
| 7,492,365 B2 | 2/2009 | Corbin et al. | |
| 7,505,040 B2 | 3/2009 | Stamm et al. | |
| 7,539,939 B1 | 5/2009 | Schomer | |
| 7,552,008 B2 | 6/2009 | Newstrom et al. | |
| 7,580,038 B2 | 8/2009 | Chik et al. | |
| 7,583,397 B2 | 9/2009 | Smith | |
| 7,636,885 B2 | 12/2009 | Merz et al. | |
| 7,701,458 B2 | 4/2010 | Sahuc et al. | |
| 7,752,222 B1 | 7/2010 | Cierniak | |
| 7,768,513 B2 | 8/2010 | Klassen | |
| 7,836,094 B2 | 11/2010 | Ornstein et al. | |
| 7,882,432 B2 | 2/2011 | Nishikawa et al. | |
| 7,937,658 B1 | 5/2011 | Lunde | |
| 7,944,447 B2 | 5/2011 | Clegg et al. | |
| 7,958,448 B2 | 6/2011 | Fattic et al. | |
| 8,098,250 B2 | 1/2012 | Clegg et al. | |
| 8,116,791 B2 * | 2/2012 | Agiv | G06F 17/214 455/466 |
| 8,201,088 B2 | 6/2012 | Levantovsky et al. | |
| 8,201,093 B2 | 6/2012 | Tuli | |
| 8,306,356 B1 * | 11/2012 | Bever | G06K 9/723 382/275 |
| 8,381,115 B2 | 2/2013 | Tranchant et al. | |
| 8,413,051 B2 | 4/2013 | Bacus et al. | |
| 8,601,374 B2 | 12/2013 | Parham | |
| 8,643,652 B2 | 2/2014 | Kaplan | |
| 8,644,810 B1 * | 2/2014 | Boyle | H04L 67/04 345/418 |
| 8,689,101 B2 | 4/2014 | Fux et al. | |
| 8,731,905 B1 * | 5/2014 | Tsang | G06F 3/16 704/257 |
| 2001/0052901 A1 | 12/2001 | Kawabata et al. | |
| 2002/0010725 A1 | 1/2002 | Mo | |
| 2002/0033824 A1 * | 3/2002 | Stamm | G06F 17/214 345/471 |
| 2002/0052916 A1 | 5/2002 | Kloba et al. | |
| 2002/0057853 A1 * | 5/2002 | Usami | G09B 21/003 382/312 |
| 2002/0087702 A1 | 7/2002 | Mori | |
| 2002/0093506 A1 | 7/2002 | Hobson | |
| 2002/0174186 A1 | 11/2002 | Hashimoto et al. | |
| 2002/0194261 A1 | 12/2002 | Teshima | |
| 2003/0014545 A1 | 1/2003 | Broussard et al. | |
| 2003/0076350 A1 | 4/2003 | Vu | |
| 2003/0197698 A1 | 10/2003 | Perry et al. | |
| 2004/0025118 A1 | 2/2004 | Renner | |
| 2004/0088657 A1 * | 5/2004 | Brown | G06F 17/214 715/234 |
| 2004/0119714 A1 | 6/2004 | Everett et al. | |
| 2004/0177056 A1 | 9/2004 | Davis et al. | |
| 2004/0189643 A1 | 9/2004 | Frisken et al. | |
| 2004/0207627 A1 | 10/2004 | Konsella et al. | |
| 2004/0233198 A1 | 11/2004 | Kubo | |
| 2005/0033814 A1 | 2/2005 | Ota | |
| 2005/0094173 A1 | 5/2005 | Engelman et al. | |
| 2005/0111045 A1 | 5/2005 | Imai | |
| 2005/0128508 A1 | 6/2005 | Greef et al. | |
| 2005/0149942 A1 | 7/2005 | Venkatraman | |
| 2005/0190186 A1 | 9/2005 | Klassen | |
| 2005/0193336 A1 | 9/2005 | Fux et al. | |
| 2005/0200871 A1 | 9/2005 | Miyata | |
| 2005/0264570 A1 | 12/2005 | Stamm | |
| 2005/0270553 A1 | 12/2005 | Kawara | |
| 2005/0275656 A1 | 12/2005 | Corbin et al. | |
| 2006/0010371 A1 | 1/2006 | Shur et al. | |
| 2006/0017731 A1 | 1/2006 | Matskewich et al. | |
| 2006/0061790 A1 | 3/2006 | Miura | |
| 2006/0072136 A1 | 4/2006 | Hodder et al. | |
| 2006/0072137 A1 | 4/2006 | Nishikawa et al. | |
| 2006/0072162 A1 | 4/2006 | Nakamura | |
| 2006/0103653 A1 | 5/2006 | Chik et al. | |
| 2006/0103654 A1 | 5/2006 | Chik et al. | |
| 2006/0168639 A1 | 7/2006 | Gan | |
| 2006/0241861 A1 | 10/2006 | Takashima | |
| 2006/0245727 A1 | 11/2006 | Nakano et al. | |
| 2006/0267986 A1 | 11/2006 | Bae et al. | |
| 2006/0269137 A1 * | 11/2006 | Evans | G06T 11/203 382/182 |

(56) References Cited

U.S. PATENT DOCUMENTS

| | | |
|---|---|---|
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1* | 9/2007 | Engelman ............... G06T 11/203 345/467 |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0154911 A1 | 6/2008 | Cheng |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0063964 A1 | 3/2009 | Huang |
| 2009/0119678 A1* | 5/2009 | Shih ....................... G06Q 10/10 719/313 |
| 2009/0158134 A1 | 6/2009 | Wang |
| 2009/0183069 A1* | 7/2009 | Duggan ................ G06F 17/214 715/269 |
| 2009/0275351 A1 | 11/2009 | Jeung et al. |
| 2009/0287998 A1 | 11/2009 | Kalra |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1* | 10/2010 | DiCamillo ............ G06F 17/211 715/810 |
| 2010/0321393 A1 | 12/2010 | Levantovsky |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0238495 A1 | 9/2011 | Kang |
| 2011/0271180 A1 | 11/2011 | Lee |
| 2011/0276872 A1 | 11/2011 | Kataria |
| 2011/0289407 A1* | 11/2011 | Naik ..................... G06F 17/214 715/269 |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1* | 5/2012 | Petrou ............... G06F 17/30253 382/182 |
| 2012/0215640 A1 | 8/2012 | Ramer et al. |
| 2012/0288190 A1* | 11/2012 | Tang ....................... G06K 9/00 382/165 |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud |
| 2013/0120396 A1 | 5/2013 | Kaplan |
| 2013/0127872 A1 | 5/2013 | Kaplan |
| 2013/0163027 A1 | 6/2013 | Shustef |
| 2013/0179761 A1* | 7/2013 | Cho ....................... G06F 17/21 715/202 |
| 2013/0215126 A1* | 8/2013 | Roberts ................ G06Q 30/06 345/522 |
| 2013/0215133 A1 | 8/2013 | Gould et al. |
| 2013/0321617 A1* | 12/2013 | Lehmann .............. G06F 3/0484 348/135 |
| 2014/0025756 A1 | 1/2014 | Kamens |
| 2014/0153012 A1* | 6/2014 | Seguin ................... G06F 3/121 358/1.11 |
| 2015/0100882 A1* | 4/2015 | Severenuk ........... G06F 17/214 715/269 |
| 2015/0193386 A1* | 7/2015 | Wurtz .................. G06F 17/214 715/269 |

FOREIGN PATENT DOCUMENTS

| | | |
|---|---|---|
| JP | 06-258982 | 9/1994 |
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

Adobe Systems Incorporated, "PostScript Language Reference—Third Edition," Feb. 1999, pp. 313-390.

Adobe Systems Incorporated, "To Unicode Mapping File Tutorial," Adobe Technical Note, XP002348387, May 2003.

"Announcing Speakeasy: A new open-source language tool from Typekit," Oct. 28, 2010, on-line http://blog.typekit.com/2010/10/28/announcing-speakeasy-a-open-source-language-tool-from-typekit/.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

International Search Report & Written Opinion issued in PCT application No. PCT/US10/01272, mailed Jun. 15, 2010, 6 pages.

International Search Report & Written Opinion issued in PCT application No. PCT/US2011/034050 dated Jul. 15, 2011, 13 pages.

International Search Report & Written Opinion, PCT/US2013/026051, mailed Jun. 5, 2013, 9 pages.

Japanese Office Action, 2009-521768, mailed Aug. 28, 2012.

Supplementary European Search Report, European Patent Office, European patent application No. EP 07796924, dated Dec. 27, 2010, 8 pages.

TrueType Fundamentals, Microsoft Typography, Nov. 1997, pp. 1-17.

Extensis, Suitcase 10.2, Quick Start Guide for Macintosh, 2001, 23 pgs.

International Search Report & Written Opinion, PCT/US2013/071519, mailed Mar. 5, 2013, 12 pages.

Open Text Exceed, User's Guide, Version 14, Nov. 2009, 372 pgs.

Universal Type Server, Upgrading from Suitcase Server, Sep. 29, 2009, 18 pgs.

Japanese Office Action, 2013-508184, mailed Apr. 1, 2015.

International Preliminary Report on Patentability issued in PCT application No. PCT/US2013/071519 dated Jun. 9, 2015, 9 pages.

"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.

(56) References Cited

OTHER PUBLICATIONS

"Colorfont/v1," Feb. 28, 2011, retrieved from the internet: http://manufacturaindependente.com/colorfont/v1/.
International Search Report & Written Opinion, PCT/US2013/076917, mailed Jul. 9, 2014, 11 pages.
"photofont.com—Use photofonts," Sep. 2, 2012, retrieved from the internet: http://web.archive.org/web/20120902021143/http://photofont.com/photofont/use/web.
European Search Report, 14187549.2, Jul. 30, 2015 7 pages.
Saurabh, Kataria et al., "Font retrieval on a large scale: An experimental study", 2010 $17^{th}$ IEEE International Conference on Image Processing (ICIP 2010); Sep. 26-29, 2010; Hong Kong, China, IEEE, Piscataway, NJ, USA, Sep. 26, 2010, pp. 2177-2180.
European Search Report, 14184499.3, Jul. 13, 2015, 7 pages.
"Flash CS4 Professional ActionScript 2.0", 2007, retrieved on http://help.adobe.com/en_US/AS2LCR/Flash_10.0/help.html?content=00000284.html on Aug. 31, 2015.
European Search Report, 13179728.4, Sep. 10, 2015, 3 pages.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Search Report & Written Opinion, PCT/US2014/010786, mailed Sep. 30, 2014, 9 pages.
Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.
"Saffron Type System", retrieved from the internet Nov. 12, 2014, 7 pages.

\* cited by examiner

Environment: Development

Now you can use OpenType features on older browsers. Enter specific text to manipulate, save, and generate CSS for your project Select a font: ⌐302  Size:     Line Height:  Alignment:   | Font Styles:
Avenir Next W04 Bold | 1.0em | 1.5em | left     |   u  ✎

Style Suggestions

| Bb | aA | ℭt | Ææ Œœ | ⅞ | ffi | 🐌 | 6¹⁹ | 1st | Sм | H² | 🚩 | ⟩– 304

Test your own text here.                                 ⌐306

```
The quick brown fox jumps over the lazy dog. 1/2 3/4
```

Preview here.                          ⌐308    Clear Formatting

The quick brown fox jumps over the lazy dog. ½ ¾

[View Code] ⌐310

FIG. 3

ADVANCED TEXT EDITOR

CLAIM OF PRIORITY

This application claims priority under 35 USC §119(e) to U.S. Patent Application Ser. No. 61/750,616, filed on Jan. 9, 2013, the entire contents of which are hereby incorporated by reference.

BACKGROUND

This description relates to advanced text editors, which may use scalable fonts.

In the ever-expanding connectivity and information sharing capabilities provided by computing devices, computer networks (e.g., the Internet) etc., various types of assets (e.g., electronic documents) such as web assets (e.g., websites, webpages, etc.) have been developed to assist with the transfer of information. Along with the almost explosive development of such assets, the content being presented by such assets has similarly grown. Text, audio, video, etc. is being incorporated into assets such as web assets to provide a more efficient and enjoyable viewing experience. For example, different languages, imagery, etc. may be included in assets to tailor content for characteristics of a viewer such as their geographical location. However, providing such rich content does not come without some constraints. For example, creating the content for such assets may appear difficult for developers unfamiliar with the variety of possible content and presentation styles.

SUMMARY

The systems and techniques described here relate to content editing applications and tools (referred to as an editor in this disclosure) capable of supporting typographical features of an asset (e.g., an electronic document, a website, webpage, etc.) represented in a scalable font format (e.g., an OpenType font format). Along with presenting the supported typographical features for creating and adjusting asset content, suggestions may be provided by the editor to assist a user in becoming more versed in the variety of features. Being presented such suggestions, users can be introduced to the variety of features that otherwise may not have been utilized or even discovered. Further, needing minimal user interaction, such as only calling for a particular font and/or portion of content (e.g., a character, word, passage, etc.) to be selected, users can quickly experience the different types of features without undue burden. Along with presenting content with such features applied, other data may also be created by the editor, for example, instructions, data files, etc. may be produced for representing the created content in one or more assets (e.g., an electronic document, website, webpage, etc.).

In one aspect, a computer-implemented method includes receiving information that represents a font and a portion of textual content of an asset. The method also includes identifying one or more typographical features supported by a scalable font format that are capable of being applied to the portion of the textual content based upon the received information representing the font and the portion of textual content of the asset. The method also includes presenting, by a computing device, an exclusive set of selectable representations. Each of the selectable representations represents one of the one or more identified typographical features supported by the scalable font format for initiating application of the corresponding typographical feature to the textual content of the asset.

Implementations may include one or more of the following features. The font may be selected through interactions with an editor. The portion of textual content may be selected through interactions with an editor. The exclusive set of selectable representations may be visually highlighted. A portion of the editor may executed by the computing device. A portion of the editor may be executed remote from the computing device. A portion of the editor may be executed by the computing device and remote from the computing device. The one or more typographical features supported by a scalable font format may be OpenType compatible. The method may include producing one or more files that include instructions for representing the one or more typographical features supported by the scalable font format applied to the textual content. The method may include presenting another set of selectable representations, each representing a variant of one of the one or more identified typographical features supported by the scalable font format for selecting a particular variant of the corresponding typographical feature.

In another aspect, a system includes a computing device that includes a memory configured to store instructions. The computing device also includes a processor to execute the instructions to perform operations that include receiving information that represents a font and a portion of textual content of an asset. Operations also include identifying one or more typographical features supported by a scalable font format that are capable of being applied to the portion of the textual content based upon the received information representing the font and the portion of textual content of the asset. Operations also include presenting, by the computing device, an exclusive set of selectable representations. Each of the selectable representations represents one of the one or more identified typographical features supported by the scalable font format for initiating application of the corresponding typographical feature to the textual content of the asset.

Implementations may include one or more of the following features. The font may be selected through interactions with an editor. The portion of textual content may be selected through interactions with an editor. The exclusive set of selectable representations may be visually highlighted. A portion of the editor may executed by the computing device. A portion of the editor may be executed remote from the computing device. A portion of the editor may be executed by the computing device and remote from the computing device. The one or more typographical features supported by a scalable font format may be OpenType compatible. The processor may execute instructions to perform operations that include producing one or more files that include instructions for representing the one or more typographical features supported by the scalable font format applied to the textual content. The processor may execute instructions to perform operations that include presenting another set of selectable representations, each representing a variant of one of the one or more identified typographical features supported by the scalable font format for selecting a particular variant of the corresponding typographical feature.

In another aspect, one or more computer readable media storing instructions that are executable by a processing device, and upon such execution cause the processing device to perform operations that include receiving information that represents a font and a portion of textual content of an asset.

Operations also include identifying one or more typographical features supported by a scalable font format that are capable of being applied to the portion of the textual content based upon the received information representing the font and the portion of textual content of the asset. Operations also include presenting, by a computing device, an exclusive set of selectable representations. Each of the selectable representations represents one of the one or more identified typographical features supported by the scalable font format for initiating application of the corresponding typographical feature to the textual content of the asset.

Implementations may include one or more of the following features. The font may be selected through interactions with an editor. The portion of textual content may be selected through interactions with an editor. The exclusive set of selectable representations may be visually highlighted. A portion of the editor may executed by the computing device. A portion of the editor may be executed remote from the computing device. A portion of the editor may be executed by the computing device and remote from the computing device. The one or more typographical features supported by a scalable font format may be OpenType compatible. Execution may cause the processing device to perform operations that include producing one or more files that include instructions for representing the one or more typographical features supported by the scalable font format applied to the textual content. Execution may cause the processing device to perform operations that include presenting another set of selectable representations, each representing a variant of one of the one or more identified typographical features supported by the scalable font format for selecting a particular variant of the corresponding typographical feature.

These and other aspects and features and various combinations of them may be expressed as methods, apparatus, systems, means for performing functions, program products, and in other ways.

Other features and advantages will be apparent from the description and the claims.

DESCRIPTION OF DRAWINGS

FIGS. 3-5 illustrate user interfaces presenting scalable font editors.

DETAILED DESCRIPTION

Figure 1:
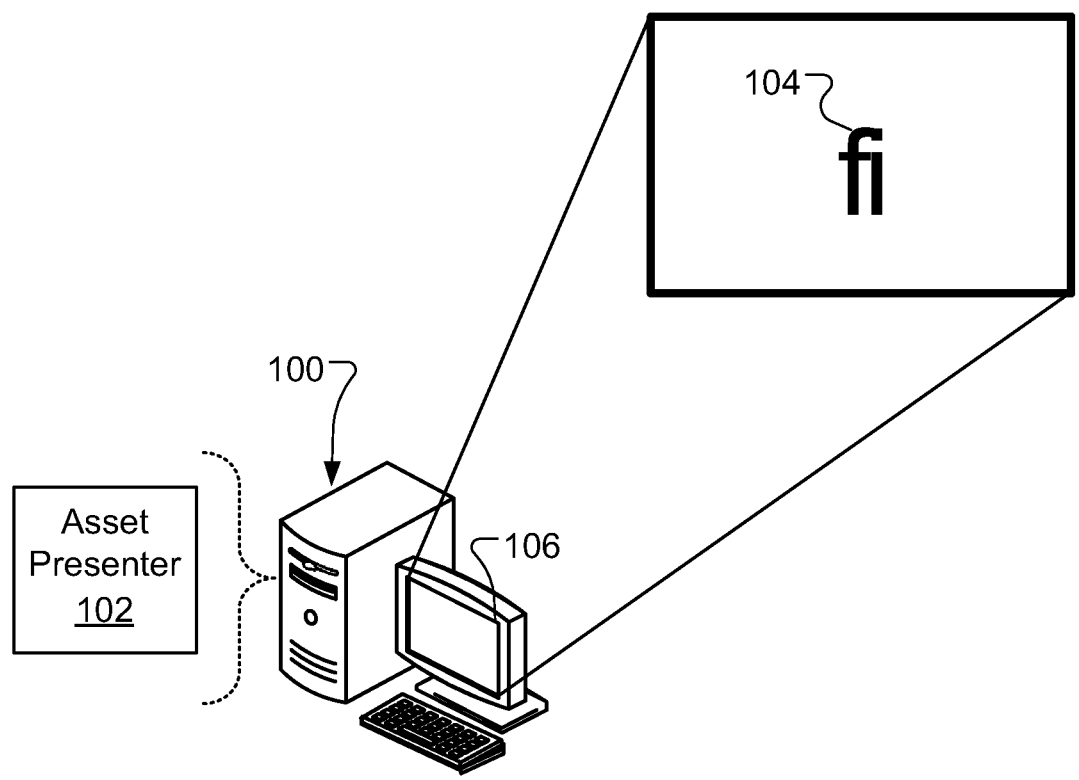
FIG. 1 illustrates a computing device presenting textual content.

Referring to FIG. 1, many types of computing devices are capable of presenting various types of graphical content such as text, images, video, etc. To present text and similar graphics, various types of font families (e.g., Times New Roman, Arial, etc.) may be used that typically include a set of fonts, e.g., regular, italic, bold, bold italic, etc. Each font generally includes a set of individual character shapes called glyphs and the glyphs generally share various design features (e.g., geometry, stroke thickness, serifs, size, etc.) associated with the font. One or more techniques may be utilized for representing such fonts; for example, outline-based representations may be adopted in which lines and curves are used to define the contours of glyphs. Such fonts may be scalable to produce text rendered in a variety of sizes (e.g., for rending by various types of computing devices) and may be represented in one or more formats. For example, scalable outline fonts may be represented in a format that includes data structures capable of supporting a variety of typographic visual symbols of many languages. OpenType is one such format capable of defining a number of typographical features that one or more scalable computer fonts may support. Features may include, for example, providing a typographical flourish on a glyph (referred to as a swash), two or more graphemes joined as a single glyph (referred to as a ligature), representing fractions as a single character (e.g., ½), etc. Formats such as the OpenType may also support typographical features that provide contextual alternatives to a character, word, phrase, etc. For example, rather than presenting the character "I" in the phrase "I caught a lovely silver fish", a graphical alternative " ※ " may be inserted into the phrase to read " ※ caught a lovely silver fish". Subscripting and superscripting, variants on capital letters (e.g., small versions of capital letters) etc. may also be supported by formats (such as OpenType) for scalable fonts.

Some computing devices, operating systems and software applications may or may not be capable of supporting advanced typographical features for scalable computer fonts. In this illustrated example, a computing device 100 (e.g., computer system) is executing an asset presenter 102 (e.g., an application, a web browser, etc.) to present content (e.g., an electronic document, a web page, a website, etc.) locally created or provided from one or more sources (e.g., a stored filed, transmitted over the Internet, etc.). In this situation, the asset presenter 102 does support OpenType fonts and is able to present content using typographical features provided by OpenType fonts. For example, a single character of the ligature "fi" 104 is presented on a display 106 of the computing device 100 rather than being presented as two individual characters "f" and "i". Prior to being presented, the ligature "fi" 104 is created to appear as a single character. For example, an editor may be executed, accessed, etc. by the computing device 100 for creating such a content presentation. However, users of such computing devices may not be very familiar with the use of ligatures and other types of typographical features and lack experience in using such features along with the basic look and feel of the features. Additionally, along with using such features for creating content (e.g., text), incorporating such rich content by adjusting such assets (e.g., electronic documents, webpages, websites, etc.) may prove difficult for users lacking expertise.

Figure 2:
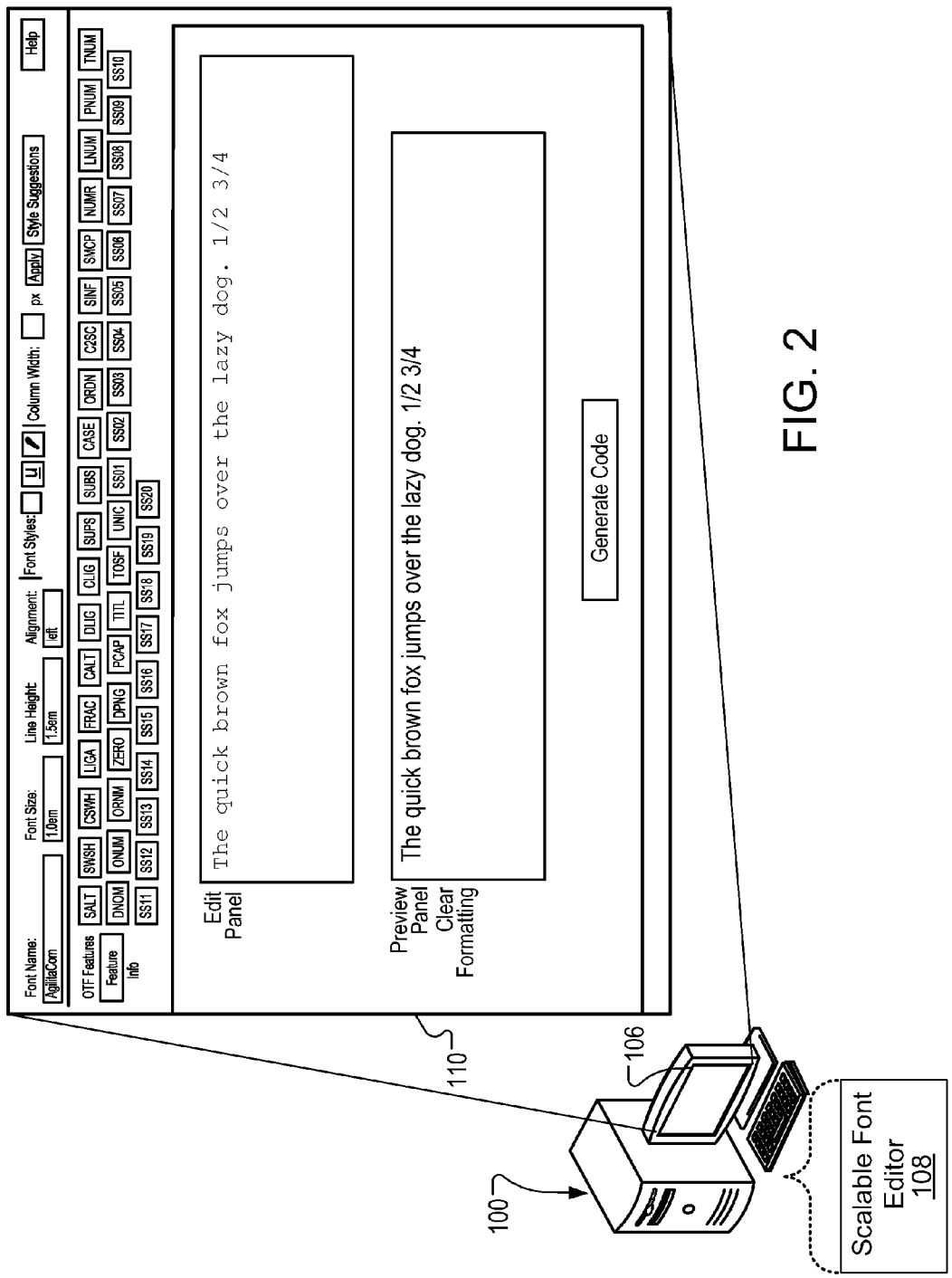
FIG. 2 illustrates a computing device that presents an editor for scalable fonts.

Referring to FIG. 2, a scalable font editor 108 is executed by the computing device 100 for creating content that utilizes typographical features of a scalable computer font in a format such as OpenType. In this arrangement, the executed editor 108 provides a user interface 110 that allows users to educate themselves about such typographical features along with creating, adjusting, etc. such visually rich content for incorporation into one or more assets (e.g., electronic documents, webpages, websites, etc.). In this particular example, the scalable font editor 108 resides on the computing device (e.g., a hard drive, etc.) and is executed by the computing device. However, other arrangements may be used for presenting such an editor on the display of a computing device. For example, one or more network environments may be used for providing the user interface 110 on the computing device. For one architecture, the functionality of such as editor may be provided by one or more remotely located computing devices and a user interface (e.g., user interface 110) may be provided over the Internet (or other type of network or networks). In some arrangements, operations executed both locally (by one computing device) and remotely (by one or more other computing devices). Such user interfaces may be provided as a service of a font service provider for developers to create and edit assets. Along with providing such functionality for creating and adjusting assets, the presented user interface may assist users (e.g., asset developers) in discovering different OpenType font features supported by a font without previously having an extensive knowledge in such features. For example, based upon the font being used to create an asset, corresponding OpenType features supported by that particular font may be presented by the user interface 110. Further, based upon the particular content to be presented (e.g., a character, word, phrase, etc.), particular OpenType features capable of representing the content may be presented by the user interface 110. For example, by selecting three adjacent characters being used to represent a fraction (e.g., "½"), the user may be alerted that a single character OpenType feature (e.g., "½") may be used to represent the fraction. Being presented such information, users may become more aware of OpenType features along with situations in which the features are supported and the options for using such features.

As mentioned, such advanced editors may be implemented as a stand-alone application (e.g., for assisting with the production of products such as e-books), implemented by using one or more networks (e.g., for providing a cloud-based application), etc. Software agent technology may also be utilized. In some arrangements the scalable font editor 108 may operate with the assistance of one or more software agents resident at the computing device 100. For example, the scalable font editor 108 may be presented through an application (e.g., a web browser) that may or may not support OpenType fonts and one or more software agents may provide information to the site where the scalable font editor 108 is executed (e.g., a remotely located font service provider). Such agents can be considered as a software module that may be executable in a substantially autonomous manner. Implementations of such software agents may utilize the systems and techniques described in U.S. patent application Ser. No. 13/672,992, entitled "Supporting Scalable Fonts" and filed 9 Nov. 2012, the entirety of which is incorporated by reference herein.

Referring to FIG. 3, various types of user interfaces may be implemented for creating and editing content to incorporate features such as OpenType font features. A user interface 300 is presented in the figure that provides supported OpenType features based upon user selections. For example, based upon the particular font selected by the user, graphical representations are presented in the user interface 300 to alert the user to the supported OpenType features. In this example, a font selection (i.e., "Avenir Next W04 Bold") from a drop down menu is represented in a field 302. In some arrangements, once a font is selected one or more operations may be executed. For example, buttons present on the user interface 300 may be reset and information associated with the selected font may be retrieved (e.g., an application program interface (API) may offer tools to retrieve data about supported font features and generate Javascript files associated with the selected font) regarding OpenType features supported by the selected font. The user interface 300 also includes other fields for presenting user-selected parameters of the selected font (e.g., size, line height, alignment, etc.) and for selecting styles for the font (e.g., color, underlining characters, etc.). In some arrangements, the user interface may provide access to a format painter for selecting OpenType features applicable to a particular portion of text (e.g., character, word, passage, etc.). Based upon the selected font (e.g., "Avenir Next W04 Bold"), the editor being executed (e.g., a locally executed editor such as scalable font editor 108) determines which OpenType features are supported by the selected font. One or more techniques may be implemented for such determinations. For example, information from one or more tables associated with the selected font may be utilized. Such tables may be used for mapping information that identifies a character (e.g., represented by a character code) and the particular glyph to be presented (e.g., represented by a glyph index). For example, a character to glyph index mapping table (cmap) may be used that maps between character codes and glyph indices. One or more tables may also be used that include information for substituting glyphs such as a glyph substitution table (GSUB), for example, to allow one or more glyph indices of a cmap table to be mapped to one or more indices representing glyph substitutes. Such tables and the corresponding information may be presented in a variety of formats, for example, the table information may be attained from one or more font files or compiled and represented as an executable module (e.g., a JavaScript file) that implements logic (e.g., rules) defined by the font tables.

In this particular example, upon determining the OpenType features supported by the selected font (shown in field 302), a group of graphical icons 304 are presented on the user interface 300 to represent the supported features. Graphical icons that represent unsupported features are generally hidden and not presented on the user interface. As such, only a set of icons that correspond to supported features are exclusively presented for user selection. In this particular example, twelve icons are included in the group of icons 304, however more or less icons may be presented based upon the selected font. The user interface 300 also includes a pane 306 for textual content to be entered (e.g., by a user) for potentially applying one or more of the OpenType features supported by the selected font. For illustration, a string of text (i.e., "The quick brown fox jumps over the lazy dog. ½ ¾") is presented in the user-entry pane 306. To present features being applied to the entered text, the user interface 300 also includes a preview pane 308. Continuing with the illustrated example, the string of text entered into field 306 is presented in the selected font in the preview pane 308 (i.e., in the font "Avenir Next W04 Bold"). In this illustrated example, none of the icons included in the group of icons 304 have been selected for applying a font feature to the user-entered text (shown in pane 306). However, if one or more of the icons is selected, corresponding features would be applied to the text of pane 306 and the resulting text would be presented in preview pane 308.

Similar to using a selected font to identify potentially applicable OpenType features, other types of information may be used for identifying the features. For example, the textual content (to which features may be applied) may be used for feature identification. By reviewing the content from particular characters, character combinations, etc., potential OpenType features may be identified. For example, detecting the character "f" followed by the character "i", the editor (e.g., the scalable font editor 108) may determine that a single-character ligature "fi" may be present and an OpenType ligature feature could potentially be applied to the text. In some arrangements, combinations of information may be used for feature identification. For example, both the selected font and content of the text may be used for identifying OpenType features that may be applied to the text.

Once the textual content is being presented (e.g., in preview pane 308) with a desired visual effect (e.g., one or more OpenType features are applied), one or more representations of the content may be produced. In one arrangement, code may be produced upon the user selecting a button 310 (e.g., labeled "View Code") included in the user interface 300. Such generated code may be provided in one or more formats, for example, code may be provided in a hypertext markup language (HTML) that includes instructions for presenting the textual content with the applied OpenType font features (as shown in preview pane 308). Code may also be provided for a cascading style sheet (CSS) that provides presentation semantics for the textual content (e.g., provided by HTML). For instances in which multiple OpenType font features are applied, files may be produced for each applied feature. For example, an HTML, CSS, Javascript file, etc. may be produced for each applied feature. Along with providing possible OpenType font features to apply to text based on a selected font, other information may be used for determining which features may possibly be applied to textual content. For example, a selected portion of text may be used in the feature determination.

Figure 4:
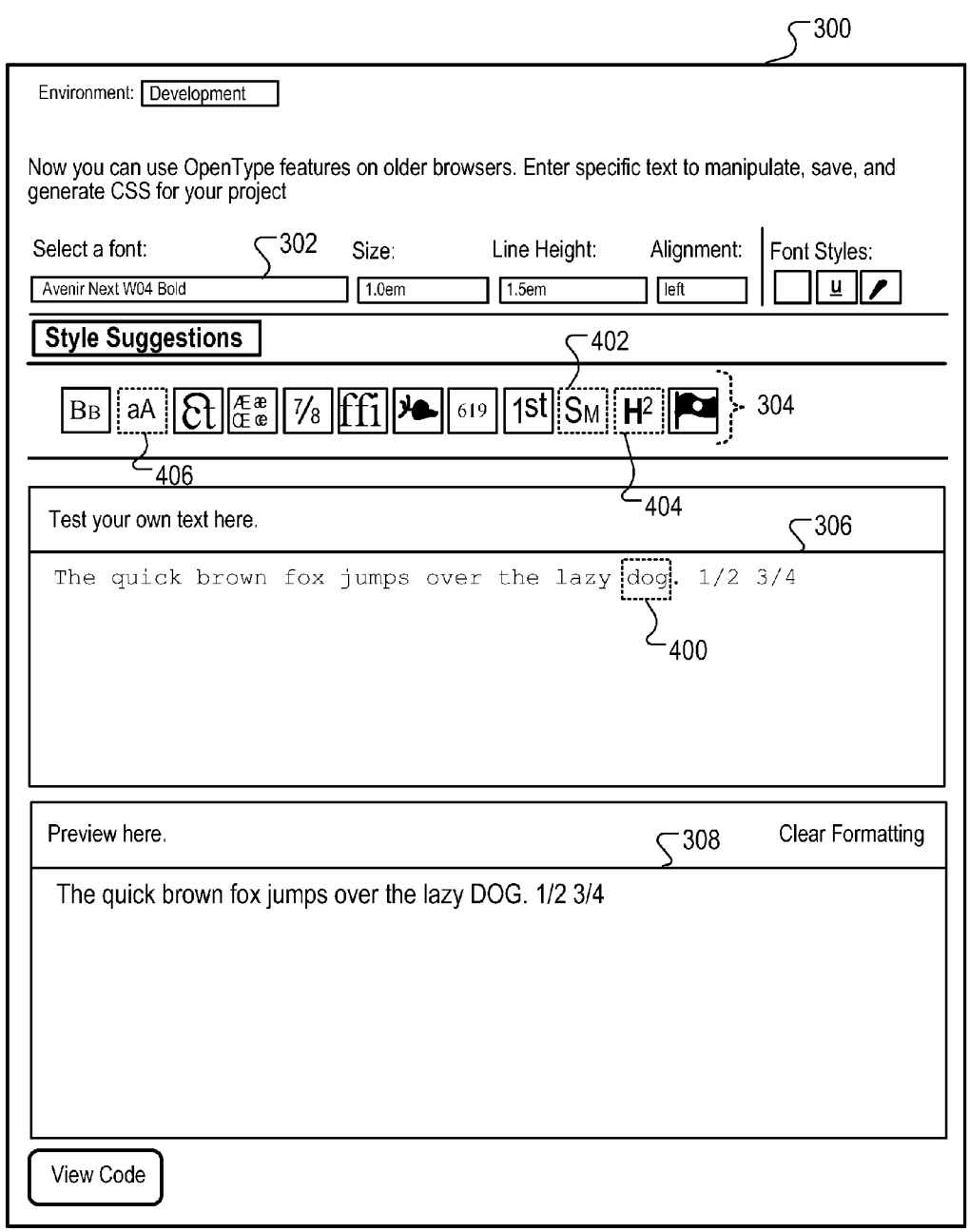

Referring to FIG. 4, the user interface 300 is presented and includes the pane 306 holding the text content entered by the user (e.g., through manual entry, from a selected file, another executed application, etc.). Based upon the selected font (displayed in field 302), the collection of icons 304 represents the OpenType font features that may be applied to the text present in the pane 306. Potential OpenType font features, which may be applied to text, may also be identified based upon other information. For example, the textual content may be used for determining which OpenType font features may potentially be applied. In one scenario, a feature for presenting a fraction as a single character may be identified as being available if appropriate text is present, has been selected, etc. (e.g., a sequence of characters such as "1", "/" and "2" or "3", "/" and "4"). In this particular example, a dashed box 400 highlights a single word ("dog") as being selected by a user (e.g., from operations of a pointing device such as a mouse). Once selected, the scalable font editor 108 uses the selected text to determine which potential OpenType font feature or features are capable of being applied to the selected text. For demonstrative purposes, based upon the word selection (highlighted by the dashed box 400), other dashed boxes 402, 404, 406 respectively highlight and identify OpenType features that may be applied to the selection. Various techniques may be used for highlighting the icon of the possible features (e.g., colors, patterns, etc. may be used to alert the user). In this example, the icon highlighted by dashed box 402 corresponds to the OpenType feature of representing the selected text in small versions of capital letters while the icon highlighted by dashed box 404 represents superscripting characters and the icon highlighted by dashed box 406 represents capitalizing characters. Once the user indicates which OpenType feature to apply (e.g., by selecting from the one or more icons corresponding to available features), the selected text is adjusted and presented in the preview pane 308. In this particular example, the small capital letter features has be selected (e.g., by selecting the icon highlighted by dashed box 402) and a corresponding representation 408 of the selected word (i.e., "dog") is presented in the preview pane 308. Three icons are highlighted in this example to indicate that they may be selected while the remaining icons (nine icons) are visually adjusted (e.g., not highlighted) to indicate that they are not selectable. Various techniques may be implemented to visually "down play" the icons representing OpenType features that are not selectable. In some arrangements, the editor (e.g., the scalable font editor 108) may remove the icons from the group of icons 304 so the user is not distracted by icons representing non-selectable OpenType features. As such, an exclusive set of icons may be presented that represent only the applicable features based upon textual content, textual content and the selected font, etc.

In this illustrated example, a selected font (e.g., "Avenir Next W04 Bold") was used to initially determine which OpenType font features would be available for being applied to text. Once a portion of the text was selected (e.g., the word "dog"), a subset of the available OpenType font features is identified from the previously identified font features. In some arrangements, font selection and textual content may be used in concert to identifying OpenType features. For example, particular features may be identified based upon the selected font and characters, combinations of characters (e.g., ligatures), etc. present in selected text. Similarly, entered text (e.g., entered into the pane 306) may be utilized for identifying OpenType features. Application of such features may be reversed through operations with the user interface 300. For example, by de-selecting a selected icon (e.g., de-select the icon highlighted by dashed box 402), the corresponding OpenType feature may be removed from the selection (e.g., the selected word "dog"). Multiple features may also be applied, for example, after selecting the icon to apply one feature (e.g., select the icon highlighted by dashed box 402) another icon may be selected (e.g., the icon highlighted by dashed box 404) to apply a second feature (e.g., superscripting the characters of the selected text).

Figure 5:
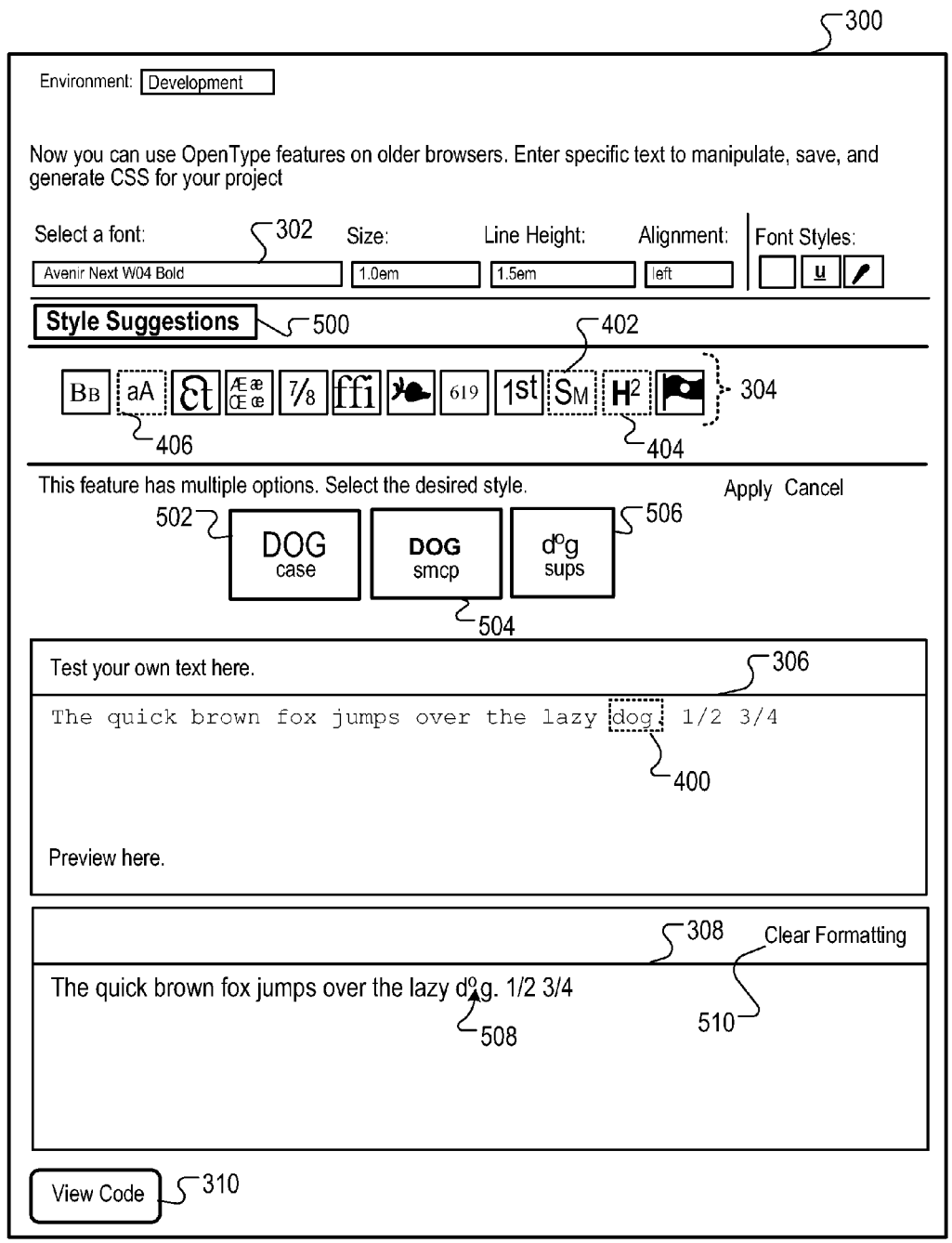

Referring to FIG. 5, to assist with determining which available OpenType font feature or features to select, suggestions may be provided by the user interface. Along with helping with selections, such suggestions may assist users (e.g., developers) in becoming more familiar with the different types of font features, educate users on how the features map to different types of textual content, etc. In some arrangements suggestions may be provided once the user has made a selection (e.g., selected a particular font, selected a portion of text, etc.), text has been entered (e.g., into pane 306), etc. As illustrated in the figure, suggestions may be provided once the user has made a selection (e.g., selected a particular font, selected a portion of text, etc.), text has been entered (e.g., in to the pane 306), etc. In this example, the user has again selected one font (i.e., "Avenir Next W04 Bold") as presented in the field 302 and a particular word (i.e., "dog") from the pane 306 as indicated with the dashed-box 400. Based upon the selections, the OpenType font features available for application to the text are indicated by the three icons (highlighted by the corresponding dashed-boxes 402, 404, 406) within the group of icons 304. To present suggestions of the available features, the user interface 300 includes a graphical button 500 that is user selectable. For demonstration, if the button 500 is selected by the user in this situation, the user interface 300 is expanded in height and three suggestions are presented that correspond to the three available OpenType font features highlighted by the dashed boxes 402, 404, 406. As shown by the user interface 300, one selectable button 502 is presented that illustrates the application of changing lower-case letters to capital letters, which corresponds to the icon highlighted by dashed box 406. Next, a suggestion is provided by a selectable button 504 that illustrates the application of changing each letter into a small version of a capital letter, which corresponds to the icon highlighted by the dashed box 402. As a third suggestion, a selectable button 506 is presented that illustrates the application of superscripting (e.g., superscripting the second letter of the text) that corresponds to the icon highlighted by the dashed box 404. By selecting one of the buttons 502, 504, 506, the corresponding OpenType font feature may be applied to the text (e.g., entered into the pane 306) and presented (e.g., in the preview pane 308) for inspection by the user. In this particular example, the third suggestion is illustrated as being selected by the user and a corresponding representation 508 of the OpenType font feature (i.e., superscripting of the second character) is presented in the preview pane 308.

Along with providing suggestions that use selected text (e.g., the term "dog"), other type of information may be provide by the interface 300 based on the available OpenType features. Available features may be tailored based upon selecting from options presented on the interface 300. In one arrangement, multiple variants may be associated with a particular OpenType feature and the interface 300 may assist the user with selecting one of the variants for applying the feature. For example, multiple graphical selections may be presented by the interface 300 that represent different shapes for a typographical flourish (known as a swash). By selecting one of the presented shapes, the user indicates which shape should be used when a swash OpenType feature is applied. Similar to applying the features, application of a feature may be removed by de-selecting the corresponding button (e.g., deselecting button 506 removes the superscripting feature from the representation presented in preview pane 308). In some arrangements, a button 510 may be provided for clearing the preview pane 308. As described with respect to FIG. 2, once the text is displayed in the preview field 308 as directed by the user, the button 310 may be selected for producing code (e.g., for an HTML file, a CSS file, etc.) that may be used for presenting the feature-applied text at a later time.

Figure 6:
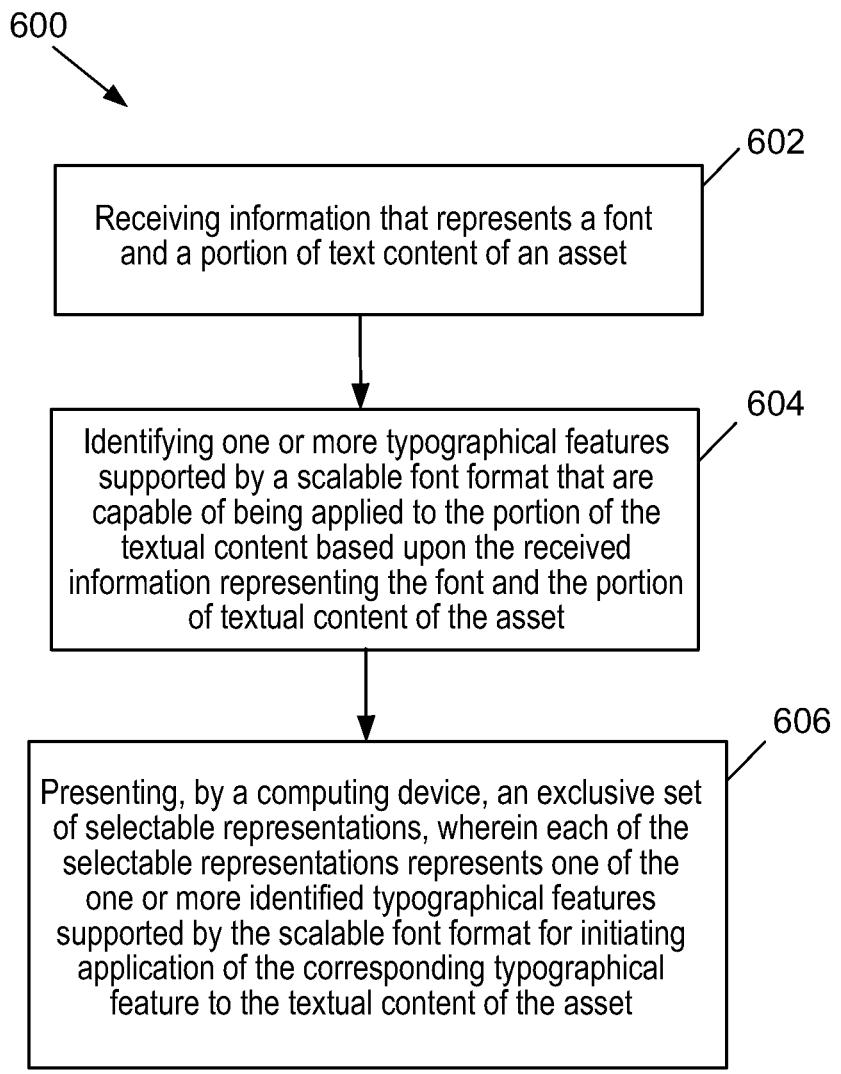
FIG. 6 is an example flow chart of operations of a scalable font editor.

Referring to FIG. 6, a flowchart 600 represents operations of a scalable font editor (e.g., the scalable font editor 108 shown in FIG. 2). Operations of the scalable font editor are typically executed by a single computing device (e.g., the computing device 100 also shown in FIG. 2); however, operations of the scalable font editor may be executed by multiple computing devices. Along with being executed at a single site (e.g., a client site, a font service provider, etc.), operation execution may be distributed among two or more locations (e.g., at a font service provider).

Operations of the scalable font editor may include receiving 602 information that represents a font and a portion of textual content of an asset. For example, through a user interface a selection may be made that indicates a particular font and a portion of text (e.g., a character, word, passage, etc.) included in an asset (e.g., an electronic document, a website, a web page, etc.). Selections may include other information, other combinations of selections associated with the textual content of an asset, etc. Operations also include identifying 604 one or more typographical features supported by a scalable font format that are capable of being applied to the portion of the textual content based upon the received information representing the font and the portion of textual content of the asset. For example, based upon the selected font and text, one or more OpenType features may be identified that can potentially be applied to the text. For example, particular characters in the text (e.g., an "f" followed by and "i") can indicate that a ligature may be present in the text and a ligature OpenType feature should be identified and made available for presenting the text. Similar, based upon the selected font, one or more OpenType features can be identified. Operations may also include presenting 606, by a computing device, an exclusive set of selectable representations. Each of the selectable representations represents one of the one or more identified typographical features supported by the scalable font format for initiating application of the corresponding typographical feature to the textual content of the asset. For example, once the OpenType features are identified based upon the selected font and selected text, a group of selectable icons may be presented that represent each of the identified features. The selectable icons may be exclusive to only represent the OpenType features that are available for application to the text of the asset. As such, the user would not be distracted or confused by icons that represent other OpenType features that are not available for application to the text of the asset.

Figure 7:
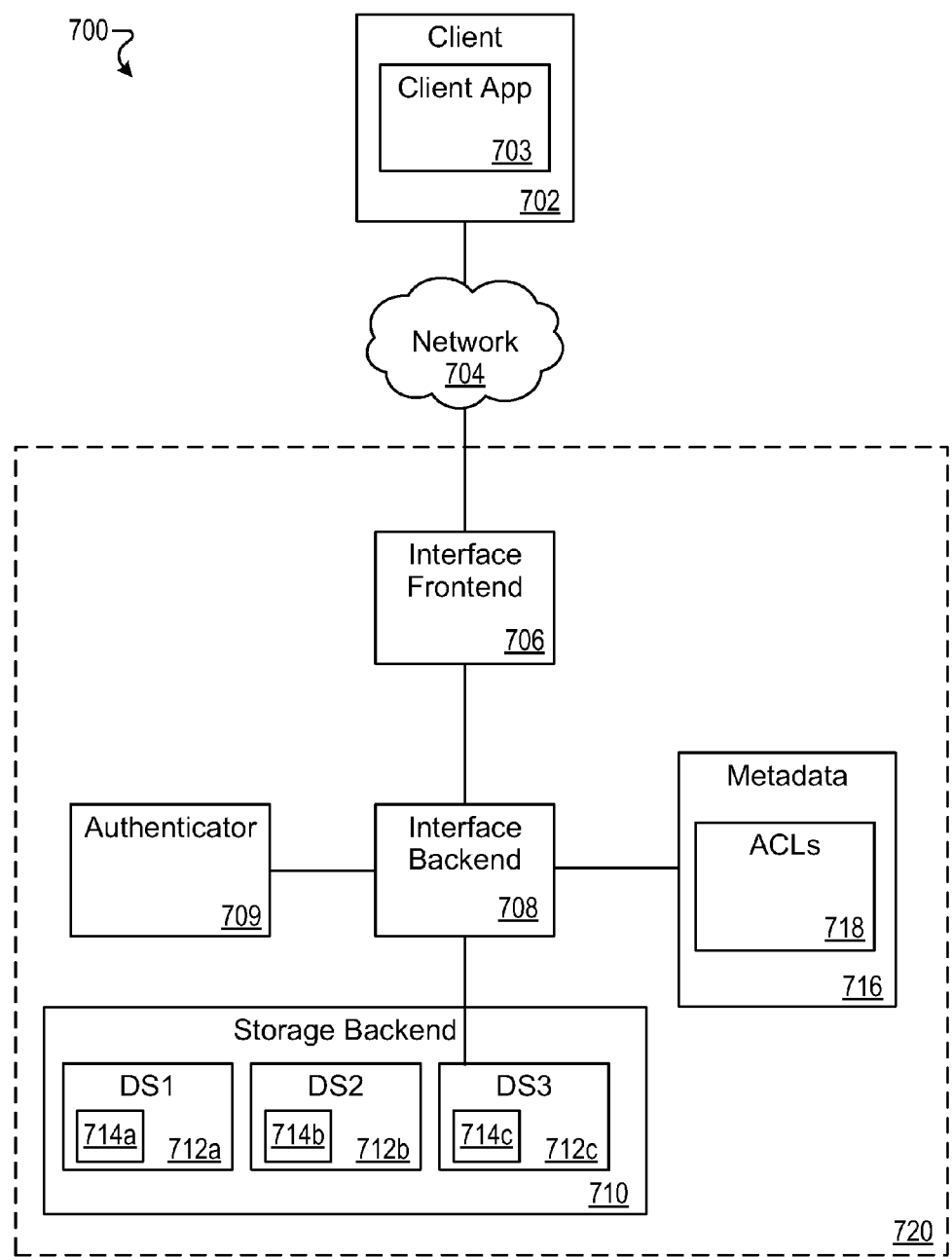
FIG. 7 is a block diagram showing an example of a system for providing hosted storage and accessing the hosted storage from a client device.

FIG. 7 is a block diagram showing an example of a system 700 for providing hosted storage and accessing the hosted storage from a client device 702. In some implementations, a hosted storage service 720 may provide access to stored data (e.g., OpenType font features) by one or more applications being executed at the service (e.g., a scalable editor executed remote for the client device 702), one or more applications being executed at the client device 702 (e.g., web browsers, scalable font editors, etc.), one or more applications being executed in a distributed manner at multiple locations (e.g., at the client device 702 and the site of the service), etc. Service functionality associated with the stored data (e.g., OpenType font features) may also include providing offsite data backup and restore functionality, provide data storage to a computing device with limited storage capabilities, and/or provide storage functionality not implemented on a computing device.

The system 700 may provide scalable stores for storing data resources. The client device 702 may upload data resources to the hosted storage service 720 and control access to the uploaded data resources. Access control may include a range of sharing levels (e.g., private, shared with one or more individuals, shared with one or more groups, public, etc.). Data stored in hosted storage service 720 can be secured from unauthorized access. The hosted storage service 720 can use a simple and consistent application programming interface, or API, which can allow arbitrary quantities of structured or unstructured data to be kept private or shared between individuals, organizations, or with the world at large. The client device 702 may access, retrieve, be provided, store, etc. data in the hosted storage service 720 for any number of a variety of reasons. For example, data may be stored for business reasons (e.g., provide identification information to attain access clearance for OpenType font features at the hosted storage service 720), or for use in data processing by other services.

Figure 8:
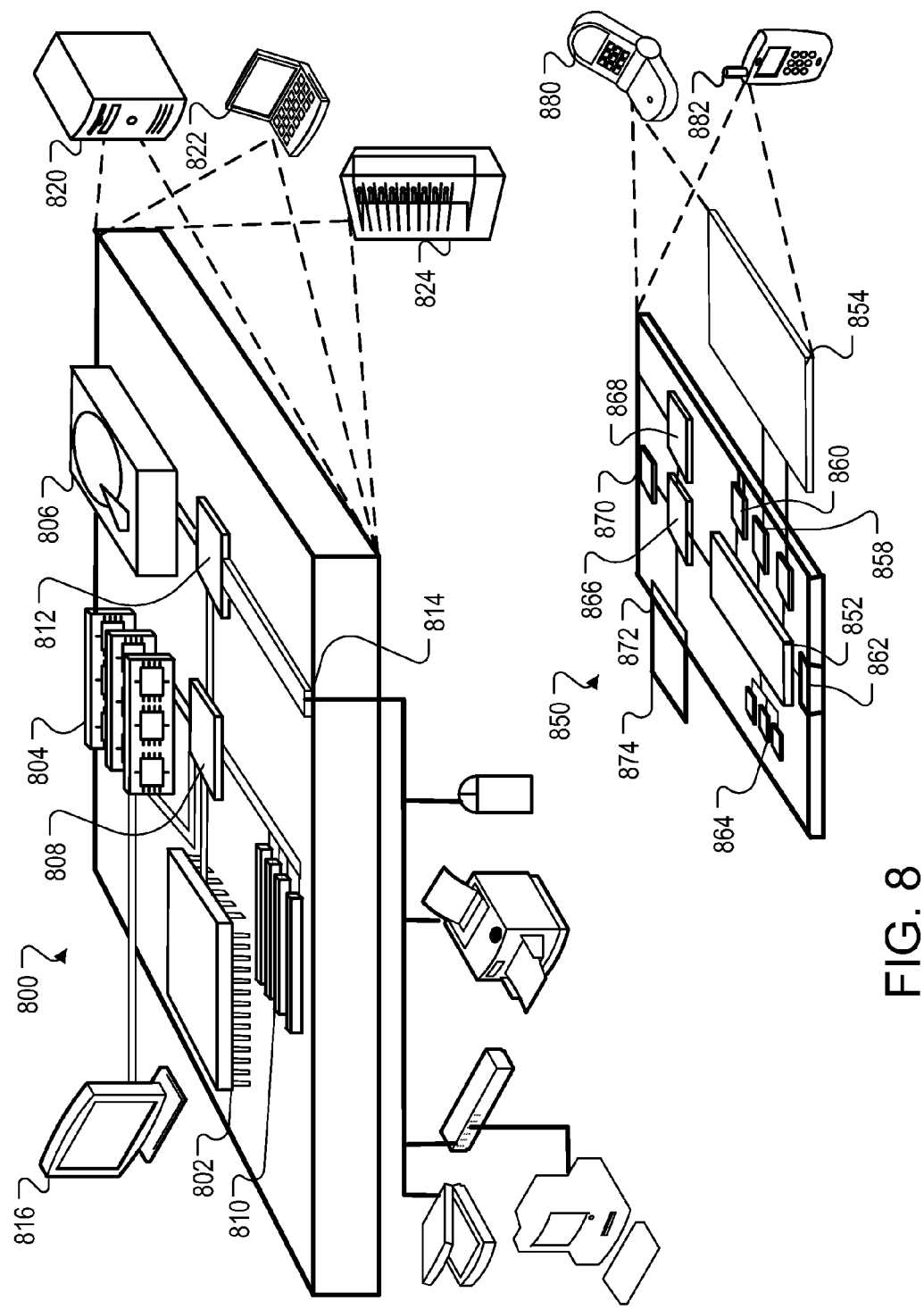
FIG. 8 illustrates an example of a computing device and a mobile computing device that can be used to implement the techniques described here.

The client device 702 may be implemented using a computing device, such as the computing device 800 or the mobile device 850 described with respect to FIG. 8. The client device 702 may communicate with the hosted storage service 720 via a network 704, such as the Internet. The client device 702 may communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 702 is shown, there may be multiple client devices communicating across the network 704 with the hosted storage service 720 and/or other services and devices.

The hosted storage service 720 may be implemented such that client applications executing on client device 702, such as a client application 703, may store, retrieve, or otherwise manipulate data resources in the hosted storage service 720. The hosted storage service 720 may be implemented by one or more server devices, which may be implemented using a computing device, such as the computing device 800 or mobile device 850 described with respect to FIG. 8. For example, the hosted storage service 720 may be implemented by multiple server devices operating in the same, or different, data centers.

The hosted storage service 720 generally includes an interface frontend 706, an interface backend 708, a storage backend 710, and metadata 716 for resources stored in the storage backend 710. The hosted storage service 720 may also include an authenticator 709 to verify that a user requesting one or more fonts should be provided access to the fonts (e.g., based on a service subscription, rental period, etc.).

In general, the interface frontend 706 may receive requests from and send responses to the client device 702. For instance, the hosted storage service 720 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 706 may receive messages from the client 702 and parse the requests into a format usable by the hosted storage service 720, such as a remote procedure call (RPC) to an interface backend 708. The interface frontend 706 may write responses generated by the hosted storage service 720 for transmission to the client 702. In some implementations, multiple interface frontends 706 may be implemented, for example to support multiple access protocols.

The interface frontend 706 may include a graphical front end, for example to display on a web browser for data access. The interface frontend 706 may include a sub-system to enable managed uploads and downloads of large files. The interface frontend 706 may monitor load information and update logs, for example to track and protect against denial of service (DOS) attacks.

A data resource may be accessed by one or more techniques such as uniquely naming the resource with a uniform resource identifier (URI), which allows the client application 703 and service 720 to exchange with the resource using a set of operations. For example, requested actions may be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 720. The PUT and POST verbs may be used to upload a resource to the service 720. PUT requests may come from the client 702 and contain authentication and authorization credentials and resource metadata in a header, such as an HTTP header. POST requests may be received when a client 702 wants to upload from a web browser form. The form POST upload protocol for the hosted storage service 720 may involve multiple form fields to provide authentication, authorization, and resource metadata. More generally, any of the API requests may include credentials for authentication and authorization, for example in a header of the request. An authorization header may be included in the REST requests, which may include an access key to identify the entity sending the request.

Alternatively, or additionally, a user may be authenticated based on stored credentials, which may be appended to the API requests. If no valid credential is present, a redirect to an authentication frontend may be generated, and the authentication frontend may be used to validate. The authentication frontend may be used by systems and services in addition to the hosted storage service 720 (e.g., if the organization operating the hosted storage service 720 also operates other web services such as email service). A user may also or alternatively be authenticated based on authentication credentials from an external credentialing service or an external service that includes credentialing functionality. User or group identifier information may be calculated from the external service's credential information. Requests sent by the client 702 to the interface frontend 706 may be translated and forwarded to the external service for authentication.

In general, resources stored in the hosted storage service 720 may be referenced by resource identifiers. The hosted storage service 720 may define namespaces to which a valid resource identifier must conform.

Resources (e.g., objects such as font data) may be stored in hosted storage service 720 in buckets. In some examples, each bucket is uniquely named in the hosted storage service 720, each data resource is uniquely named in a bucket, and every bucket and data resource combination is unique. Data resources may be uniquely identified by a URI that includes the bucket name and the resource name, and identifies the hosted storage service 720.

The interface backend 708 along with the authenticator 709 may handle request authentication and authorization, may manage data and metadata, and may track activity such as for billing. As one example, the interface backend 708 may query the authenticator 709 when a request for one or more fonts, font features, etc. is received. The interface backend 708 may also provide additional or alternative functionality. For example, the interface backend 708 may provide functionality for independent frontend/backend scaling for resource utilization and responsiveness under localized heavy loads. Data management may be encapsulated in the interface backend 708 while communication serving may be encapsulated in the interface frontend 706. The interface backend 708 may isolate certain security mechanisms from the client-facing interface frontend 706.

The interface backend 708 may expose an interface usable by both the interface frontend 706 and other systems. In some examples, some features of the interface backend 708 are accessible only by an interface frontend (not shown) used by the owners of the hosted storage service 720 (internal users). Such features may include those needed for administrative tasks (e.g., resolving a resource reference). The interface backend 708 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 708 may manage metadata 716 associated with data resources, for example in a MySQL database. User-specified names labeling the buckets can be completely defined within the metadata 716, and resource metadata 716 can map a resource name to one or more datastores 712 storing the resource. The metadata 716 can also contain bucket and resource creation times, resource sizes, hashes, and access control lists 718 (ACL 718) for both buckets and resources. The interface backend 708 can log activity and track storage consumption (e.g., for accounting support).

The ACLs 718 may generally define who is authorized to perform actions on corresponding buckets or resources, and the nature of the permitted actions. The ACLs 718 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs override more general ones.

The storage backend 710 may contain multiple datastores 712a-712c. Although three datastores 712 are shown, more or fewer are possible. Each of the datastores 712a-712c may store data resources 714a-714c in a particular format. For example, data store 712a may store a data resource 714a as a Binary Large Object (BLOB), data store 712b may store a data resource 714b in a distributed file system (e.g., Network File System), and data store 712c may store a data resource 714c in a database (e.g., MySQL).

FIG. 8 shows an example of example computer device 800 and example mobile computer device 850, which can be used to implement the techniques described herein. For example, a portion or all of the operations of the scalable font editor 108 (shown in FIG. 2), an application (e.g., a web browser) accessing a scalable font editor, etc. may be executed by the computer device 800 and/or the mobile computer device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed controller 808 connecting to memory 804 and high-speed expansion ports 810, and low speed controller 812 connecting to low speed expansion port 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

Memory 804 stores data within computing device 800. In one implementation, memory 804 is a volatile memory unit or units. In another implementation, memory 804 is a non-volatile memory unit or units. Memory 804 also can be another form of computer-readable medium, including, e.g., a magnetic or optical disk.

Storage device 806 is capable of providing mass storage for computing device 800. In one implementation, storage device 806 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 804, storage device 806, memory on processor 802, and the like.

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer including, e.g., laptop computer 822. In some examples, components from computing device 800 can be combined with other components in a mobile device (not shown), including, e.g., device 850. Each of such devices can contain one or more of computing device 800, 850, and an entire system can be made up of multiple computing devices 800, 850 communicating with each other.

Computing device 850 includes processor 852, memory 864, an input/output device including, e.g., display 854, communication interface 866, and transceiver 868, among other components. Device 850 also can be provided with a storage device, including, e.g., a microdrive or other device, to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, including, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 864, expansion memory 874, and/or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, including, e.g., using a Bluetooth®, WiFi, or other such transceiver (not shown). In addition, GPS (Global Positioning System) receiver module 870 can provide additional navigation- and location-related wireless data to device 850, which can be used as appropriate by applications running on device 850. Sensors and modules such as cameras, microphones, compasses, accelerators (for orientation sensing), etc. maybe included in the device.

Device 850 also can communicate audibly using audio codec 860, which can receive spoken data from a user and convert it to usable digital data. Audio codec 860 can likewise generate audible sound for a user, including, e.g., through a speaker, e.g., in a handset of device 850. Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
receiving information that represents a font and a portion of textual content of an asset;
identifying one or more typographical features supported by a scalable font format that are capable of being applied to the portion of the textual content based upon the received information representing the font and the portion of textual content of the asset; and
presenting, by a computing device, an exclusive set of selectable representations, wherein each of the selectable representations represents one of the one or more identified typographical features supported by the scalable font format for initiating application of the corresponding typographical feature to the textual content of the asset.

2. The computer-implemented method of claim 1, wherein the font is selected through interactions with an editor.

3. The computer-implemented method of claim 2, wherein a portion of the editor is executed by the computing device.

4. The computer-implemented method of claim 2, wherein a portion of the editor is executed remote from the computing device.

5. The computer-implemented method of claim 2, wherein a portion of the editor is executed by the computing device and remote from the computing device.

6. The computer-implemented method of claim 1, wherein the portion of textual content is selected through interactions with an editor.

7. The computer-implemented method of claim 1, wherein the exclusive set of selectable representations is visually highlighted.

8. The computer-implemented method of claim 1, wherein the one or more typographical features supported by a scalable font format are OpenType compatible.

9. The computer-implemented method of claim 1, further comprising:
producing one or more files that include instructions for representing the one or more typographical features supported by the scalable font format applied to the textual content.

10. The computer-implemented method of claim 1, further comprising:
presenting another set of selectable representations, each representing a variant of one of the one or more identified typographical features supported by the scalable font format for selecting a particular variant of the corresponding typographical feature.

11. A system comprising:
a computing device comprising:
a memory configured to store instructions; and
a processor to execute the instructions to perform operations comprising:
receiving information that represents a font and a portion of textual content of an asset;
identifying one or more typographical features supported by a scalable font format that are capable of being applied to the portion of the textual content based upon the received information representing the font and the portion of textual content of the asset; and
presenting, by the computing device, an exclusive set of selectable representations, wherein each of the selectable representations represents one of the one or more identified typographical features supported by the scalable font format for initiating application of the corresponding typographical feature to the textual content of the asset.

12. The system of claim 11, wherein the font is selected through interactions with an editor.

13. The system of claim 12, wherein a portion of the editor is executed by the computing device.

14. The system of claim 12, wherein a portion of the editor is executed remote from the computing device.

15. The system of claim 12, wherein a portion of the editor is executed by the computing device and remote from the computing device.

16. The system of claim 11, wherein the portion of textual content is selected through interactions with an editor.

17. The system of claim 11, wherein the exclusive set of selectable representations is visually highlighted.

18. The system of claim 11, wherein the one or more typographical features supported by a scalable font format are OpenType compatible.

19. The system of claim 11, wherein the processor executes the instructions to perform operations comprising:
producing one or more files that include instructions for representing the one or more typographical features supported by the scalable font format applied to the textual content.

20. The system of claim 11, wherein the processor executes the instructions to perform operations comprising:
presenting another set of selectable representations, each representing a variant of one of the one or more identified typographical features supported by the scalable font format for selecting a particular variant of the corresponding typographical feature.

21. One or more computer readable media storing instructions that are executable by a processing device, and upon such execution cause the processing device to perform operations comprising:
receiving information that represents a font and a portion of textual content of an asset;
identifying one or more typographical features supported by a scalable font format that are capable of being applied to the portion of the textual content based upon the received information representing the font and the portion of textual content of the asset; and
presenting, by a computing device, an exclusive set of selectable representations, wherein each of the selectable representations represents one of the one or more identified typographical features supported by the scalable font format for initiating application of the corresponding typographical feature to the textual content of the asset.

22. The computer readable media of claim 21, wherein the font is selected through interactions with an editor.

23. The computer readable media of claim 22, wherein a portion of the editor is executed by the computing device.

24. The computer readable media of claim 22, wherein a portion of the editor is executed remote from the computing device.

25. The computer readable media of claim 22, wherein a portion of the editor is executed by the computing device and remote from the computing device.

26. The computer readable media of claim 21, wherein the portion of textual content is selected through interactions with an editor.

27. The computer readable media of claim 21, wherein the exclusive set of selectable representations is visually highlighted.

28. The computer readable media of claim 21, wherein the one or more typographical features supported by a scalable font format are OpenType compatible.

29. The computer readable media of claim 21, wherein execution cause the processing device to perform operations comprising:
   producing one or more files that include instructions for representing the one or more typographical features supported by the scalable font format applied to the textual content.

30. The computer readable media of claim 21, wherein execution cause the processing device to perform operations comprising:
   presenting another set of selectable representations, each representing a variant of one of the one or more identified typographical features supported by the scalable font format for selecting a particular variant of the corresponding typographical feature.

* * * * *

UNITED STATES PATENT AND TRADEMARK OFFICE
CERTIFICATE OF CORRECTION

PATENT NO.        : 9,626,337 B2
APPLICATION NO.   : 14/151062
DATED             : April 18, 2017
INVENTOR(S)       : Sampo Juhani Kaasila et al.

It is certified that error appears in the above-identified patent and that said Letters Patent is hereby corrected as shown below:

On the Title Page

Column 2, Primary Examiner, Line 1, delete "Lauries Ries" and insert --Laurie Ries--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*